United States Patent
Hentschel et al.

(10) Patent No.: US 6,844,878 B2
(45) Date of Patent: Jan. 18, 2005

(54) MEDIA PROCESSING REDUCTION IN HIDDEN AREAS

(75) Inventors: Christian Hentschel, Soerendonk (NL); Gerardus Carolus van Loo, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 361 days.

(21) Appl. No.: 10/011,880

(22) Filed: Dec. 4, 2001

(65) Prior Publication Data

US 2003/0103084 A1 Jun. 5, 2003

(51) Int. Cl.[7] .............................................. G06T 15/00
(52) U.S. Cl. ........................................................ 345/421
(58) Field of Search .......................... 348/565; 345/421, 345/790, 791, 793, 797, 947

(56) References Cited

U.S. PATENT DOCUMENTS

| | | | |
|---|---|---|---|
| 5,031,044 A | * | 7/1991 | Canfield et al. ............ 348/565 |
| 5,404,177 A | * | 4/1995 | Imai et al. .................. 348/588 |
| 5,588,106 A | * | 12/1996 | Habata ........................ 345/790 |
| 5,742,277 A | * | 4/1998 | Gossett et al. .............. 345/611 |

OTHER PUBLICATIONS

Mancini et al. "Microprocessor controlled picture in picture system" IEEE transaction on Consumer Electronics; vol. 36, No. 3, Aug. 1990, pp. 375–379.*

Schaufler, Dynaically Generated Imposters, 1995, pp. 1–5.*

* cited by examiner

*Primary Examiner*—Phu K. Nguyen

(57) ABSTRACT

A system and method for processing overlapping video and/or graphics images. The system comprises a first image processing system for processing a first image in a first window; a second image processing system for processing a second image in a second window, wherein the second window overlaps a portion of the first window; a window controller that calculates a set of coordinates for the second window; and a process control system that determines a set of pixels not to process in the overlapped portion of the first window based on the area defined by the calculated set of coordinates less any identified required hidden pixels.

21 Claims, 4 Drawing Sheets

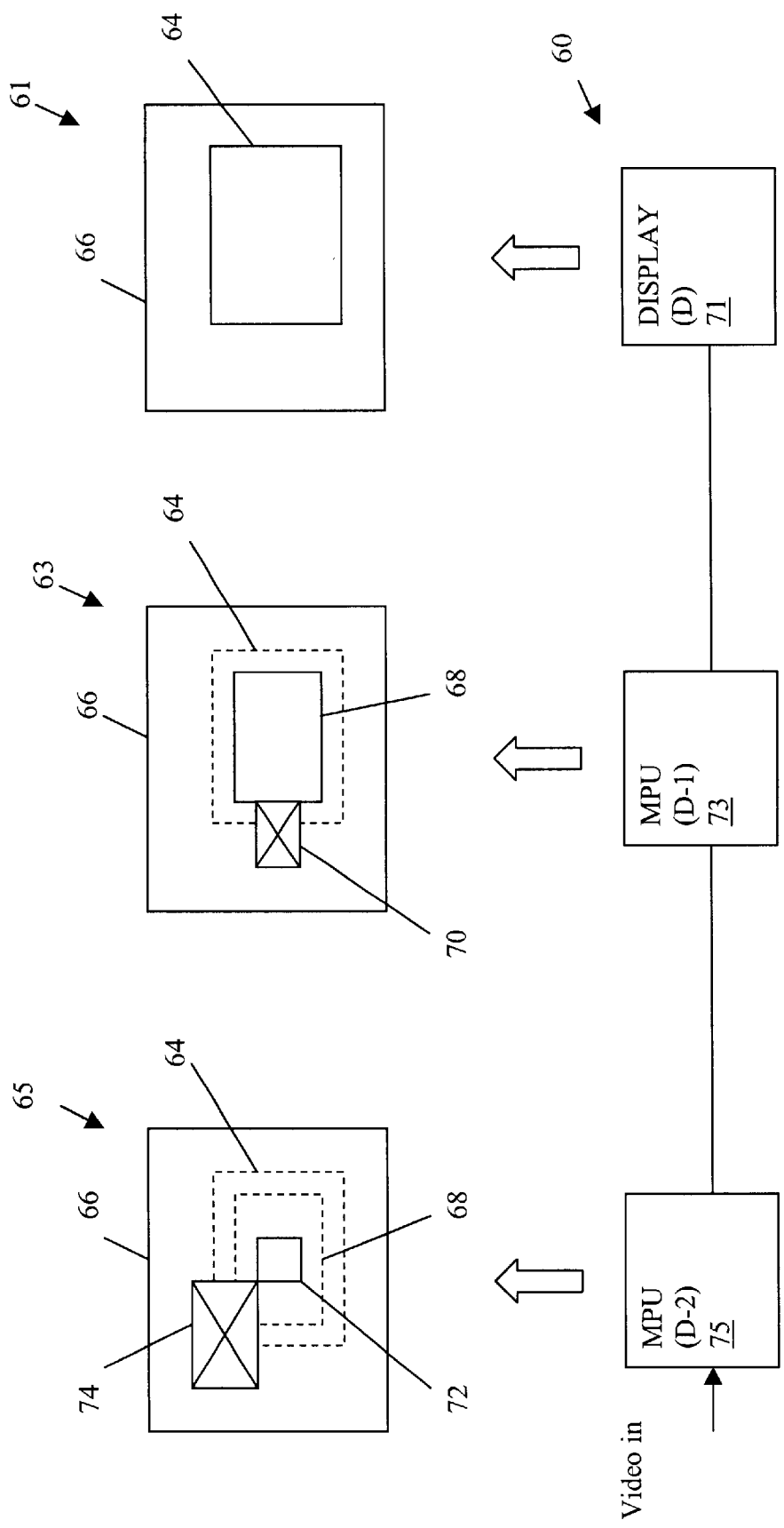

MEDIA PROCESSING REDUCTION IN HIDDEN AREAS

BACKGROUND OF THE INVENTION

1. Technical Field

The present invention relates generally to media processing, and more specifically relates to a system and method for saving computational resources by not processing pixels in video/graphics images that do not contribute to the output (e.g., hidden areas).

2. Related Art

As new media-based technologies (e.g., image, video or graphics) enter the marketplace, systems having advanced digital processing features, such as picture-in-picture, have become more desirable. Moreover, with the advent of technologies such as web-based and wireless-based video communications, the ability to efficiently process encoded media data has become particularly critical. Media-based algorithms are usually processed independent of their appearance on the final display. In case of multi-window displaying, many areas are hidden.

Systems for media processing are often designed for a specific quality. In the past, such systems were implemented on dedicated hardware to operate in a specific environment. For instance, in traditional television receivers, specific integrated circuits are combined to perform various functions, e.g. color decoding for NTSC or PAL systems, noise reduction, or frame rate up-conversion. Such dedicated hardware is often designed for worst-case requirements, so there is no need for saving processing resources.

Recently however, the trend of technology is to develop more and more programmable platforms that allow media applications to be implemented in software. Expected advantages include reduced time-to-market, re-use of hardware and software modules, portability, and flexibility. It is known however that programmable components are expensive in terms of silicon area and power consumption compared to dedicated hardware. Accordingly, cost-effective solutions are needed for systems with programmable components in order to provide higher quality or increased functionality.

As noted above, many systems allow more than one application to be shown on a display by using windows (e.g. teletext, picture-in-picture, etc.), or by using a split-screen. Such applications are now common on wide-screen TVs. In order to achieve multiple windows, several media processing algorithms are needed for each specific application, e.g., decoding algorithms; picture enhancement algorithms; graphics overlay algorithms; and display processing algorithms. Some of these include mainly spatial processing, such as spatial peaking, spatial decoding for luminance-chrominance separation of analog signals, and spatial noise reduction. Others include temporal processing, e.g., up-conversion using motion estimation, and pixel-based processing. In any case, processing of data in hidden areas often results in wasted computational resources. Accordingly, a need exists to address this issue in order to lower the resource needs of the system.

SUMMARY OF THE INVENTION

The present invention addresses the above-mentioned problems, as well as others, by providing a system and method that avoids processing data in overlapped portions of a multi-window video and/or graphics image processing environment.

In a first aspect, the invention provides a system for processing overlapping images, comprising: a first image processing system for processing a first image in a first window; a second image processing system for processing a second image in a second window, wherein the second window overlaps a portion of the first window; a window controller that calculates a set of coordinates for the second window; and a process control system that determines a set of pixels not to process in the overlapped portion of the first window based on the calculated set of coordinates.

In a second aspect, the invention provides a program product stored on a recordable medium for processing overlapping images, comprising: means for processing a first image; means for processing a second image, wherein the second image overlaps a portion of the first image; means for calculating a set of coordinates of the second image; and means for determining a set of pixels not to process in the overlapped portion of the first image based on the calculated set of coordinates.

In a third aspect, the invention provides a method for processing overlapping images, comprising: processing a first image; processing a second image, wherein the second image overlaps a portion of the first image; outputting a set of coordinates for the second image to a process control system; and determining a set of pixels not to process in the overlapped portion of the first image based on an area defined by the outputted set of coordinates less any required hidden pixels.

In a fourth aspect, the invention provides a system for processing overlapping images, comprising: a first image processing system for processing a first image in a first window; a second image processing system for processing a second image in a second window, wherein the second window overlaps a portion of the first window; an enhancement filter that spatially enhances a pixel in a non-overlapping portion of the first window using data from at least one neighboring pixel in the overlapped portion of the first window; and a process control system that identifies a subset of the pixels in the overlapped portion of the first window that does not need to be processed, wherein the subset includes each pixel in the overlapped portion of the first window minus the at least one neighboring pixel in the overlapped portion of the first window.

In a fifth aspect, the invention provides an imaging system for generating an output comprised of a first window and a second window, wherein the second window overlays a portion of the first window, the imaging system comprising: a process control system that determines a region of unnecessary pixels within the overlaid portion of the first window for a first frame of image data; a first media processing unit that identifies a set of pixels within the region of unnecessary pixels that are required for processing a second frame of data, and calculates a reduced area of unnecessary pixels; and a second media processing unit that identifies a subset of the set of pixels required for processing a third frame of data and calculates a further reduced region of unnecessary pixels.

BRIEF DESCRIPTION OF THE DRAWINGS

An exemplary embodiment of the present invention will hereinafter be described in conjunction with the appended drawings, where like designations denote like elements, and:

FIG. 4 shows how a chain of media processing units effects pixel processing.

DETAILED DESCRIPTION OF THE INVENTION

Figure 1:
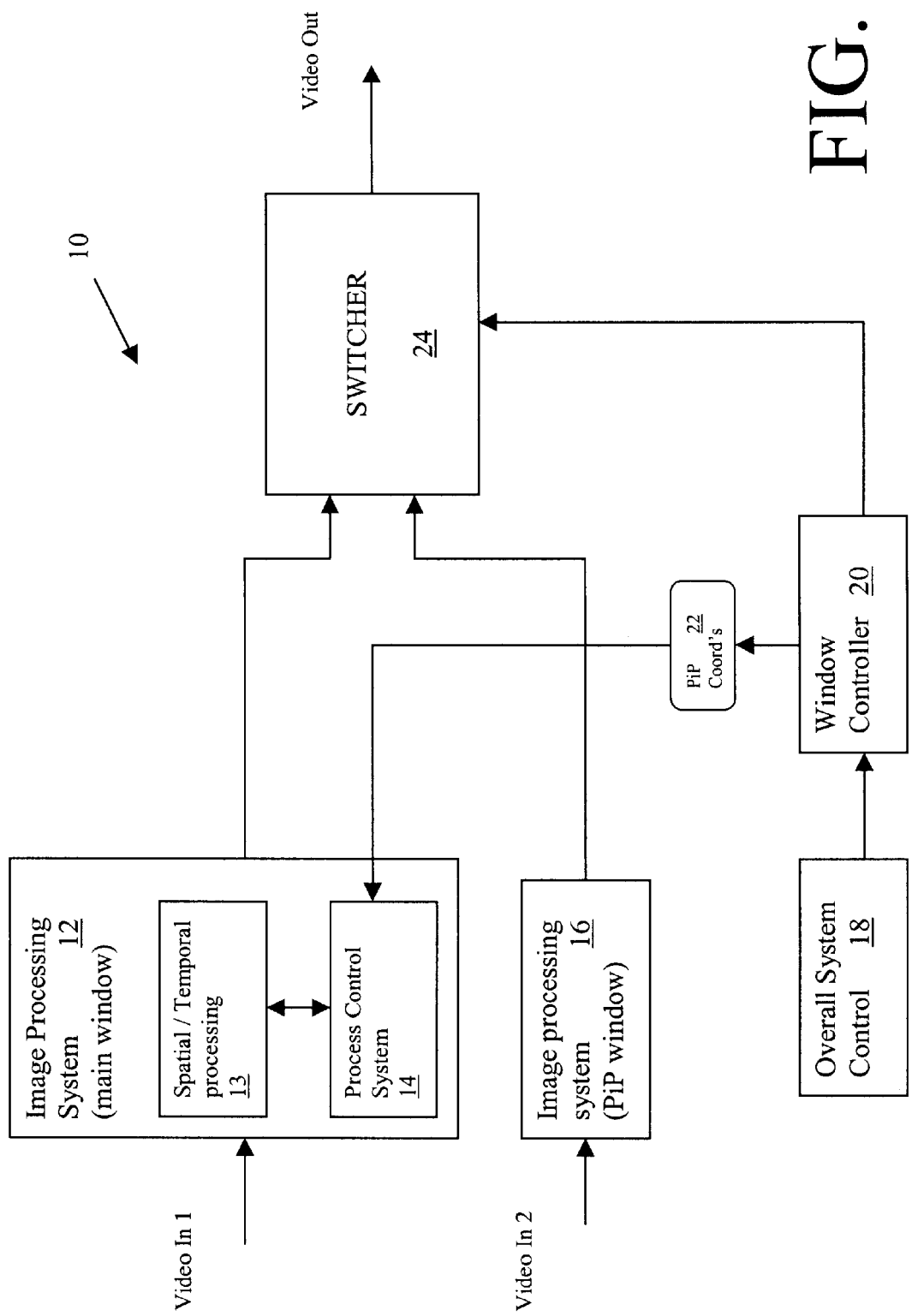
FIG. 1 depicts a block diagram of a processing system in accordance with an embodiment of the present invention.

Referring now to the drawings, FIG. 1 depicts a media processing system 10 for processing video data comprised of a first and a second video input (Video In 1 and Video In 2), and outputting a single video image (Video Out). In accordance with this embodiment, the first video input is processed for display in a first window and the second video input is processed for display in a second window that overlaps a portion of the first window, or vice versa. In one exemplary embodiment, the first window comprises a main window, and the second window comprises a picture-in-picture (PiP) window that overlaps a portion of the main window. It should be understood however that the present invention could apply to any imaging system in which a plurality of images are separately processed and overlap each other in a single output. For instance, rather than overlapping windows, the processed images may include arbitrarily shaped objects or segments.

In addition, it should also be understood that while the exemplary embodiments described herein are directed primarily at video images, the present invention also applies to graphics images and mixed graphics and video images, such as those used in MPEG-4 based systems.

The first video input is processed by image processing system 12 and the second video input is processed by image processing system 16. The image processing systems may include any functionality, such as decoding, filtering, or enhancement operations. Moreover, image processing system 12 may optionally include spatial and/or temporal processing 13, which are described in further detail below. The output of the two processing systems 12 and 16 are sent to switcher 24, which outputs a single video image (Video Out) containing the first and second windows. Overall system control 18 controls window controller 20, which tells switcher 24 how to display the two windows, e.g., how and where the windows should appear, which window should be on top, etc.

When an output image is created containing a second window overlapping a first window, a portion of the first window is hidden from view. In this case, image processing system 12 may be unnecessarily processing some or all of the hidden area. The present invention eliminates unnecessary processing by including a process control system 14 that identifies pixels in the first video input that do not need to be processed. The pixels are identified based on: (1) the coordinates of the second window (e.g., PiP coordinates 22), and (2) dependency information discerned from any spatial and/or temporal processing 13. Dependency information exists whenever information in the hidden or overlapped pixels is needed to process pixels in a non-overlapping area. In a case where only pixel processing is done, no dependency information is generally required.

Figure 2:
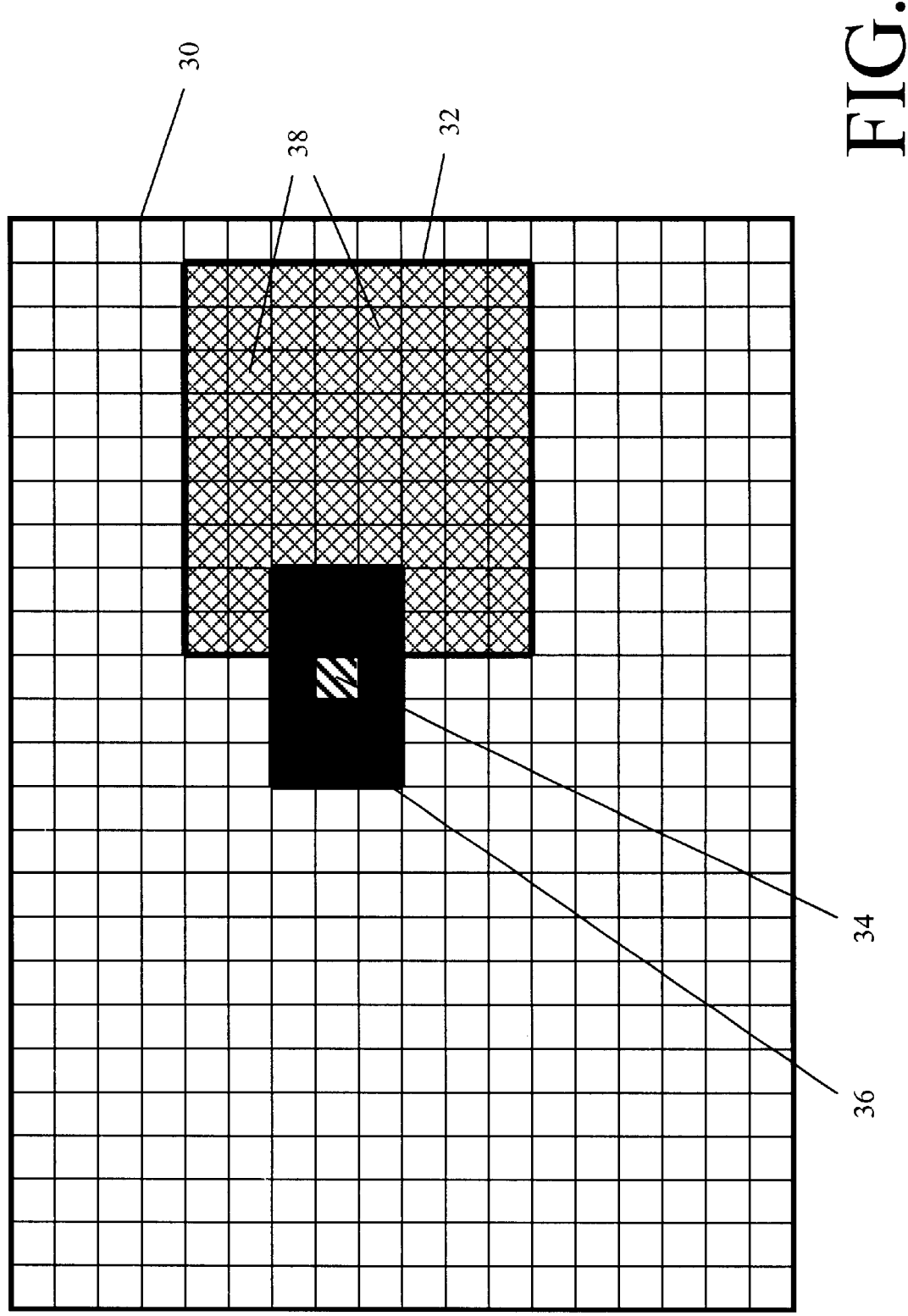
FIG. 2 depicts a second window overlapping a first window in accordance with an embodiment of the invention.

Referring now to FIG. 2, an exemplary video output is shown comprising a PiP window 32 that overlaps a portion of the main window 30 and hides a set of pixels 38 from the main window 30. In a situation where there is no temporal or spatial processing and only pixel processing is done, e.g., with a look-up table (zero-dimensional processing without using information from other adjacent pixels or fields), the entire set of pixels 38 hidden by the PiP window 32 does not need to be processed by image processing system 12. Because there are no dependencies relating to the hidden pixels 38, no image degradation will result from not processing the hidden pixels 38 in main window 30.

In case of more dimensional, spatial processing, it may become necessary to process some of the hidden pixels 38. Spatial processing, which may include for instance a sharpness enhancement filter, processes a pixel using coefficient data from neighboring pixels. An example may include a spatial filter with five coefficients in the horizontal direction, and three coefficients in the vertical direction, as shown in FIG. 2. In the case shown in FIG. 2, pixel 34 is the center pixel 34 in both dimensions and is processed using data from neighboring pixels 36 (shown in black). Calculation of the center pixel 34 is dependent on the neighboring pixels 36. Because the processed pixel 34 borders PiP window 32, six "required" pixels are needed from the hidden area for the calculation of the center pixel 34 (i.e., the six black pixels in window 32). If processing of those six pixels were skipped, degradation could result. Accordingly, these six pixels, although hidden, should not be eliminated from processing. Assuming no other dependencies exist, processing of the remaining pixels hidden by the PiP window 32 can be skipped. It should be understood that other types and shapes of spatial filters (e.g., a cross, a line, etc.) could be used and result in different required hidden pixels being identified.

Similarly, if temporal processing is involved, e.g. for temporal up-conversion with motion estimation and motion compensation, the hidden information may be important to calculate the correct temporal position of objects. In this case, such objects may appear or re-appear in the next field or frame outside the PiP window 32. Thus, hidden information, such as motion estimation vectors may still be needed, while other pixel processing information, such as pixel interpolation for the hidden areas might be unnecessary and could therefore be eliminated to save computer resources.

In the case of temporal processing, e.g., involving motion adaptive recursive filtering (used for noise reduction), hidden areas might partly be ignored to save computing resources. Depending on the velocity of objects, which appear or re-appear outside the window or hidden areas, some image degradation may result.

Figure 3:
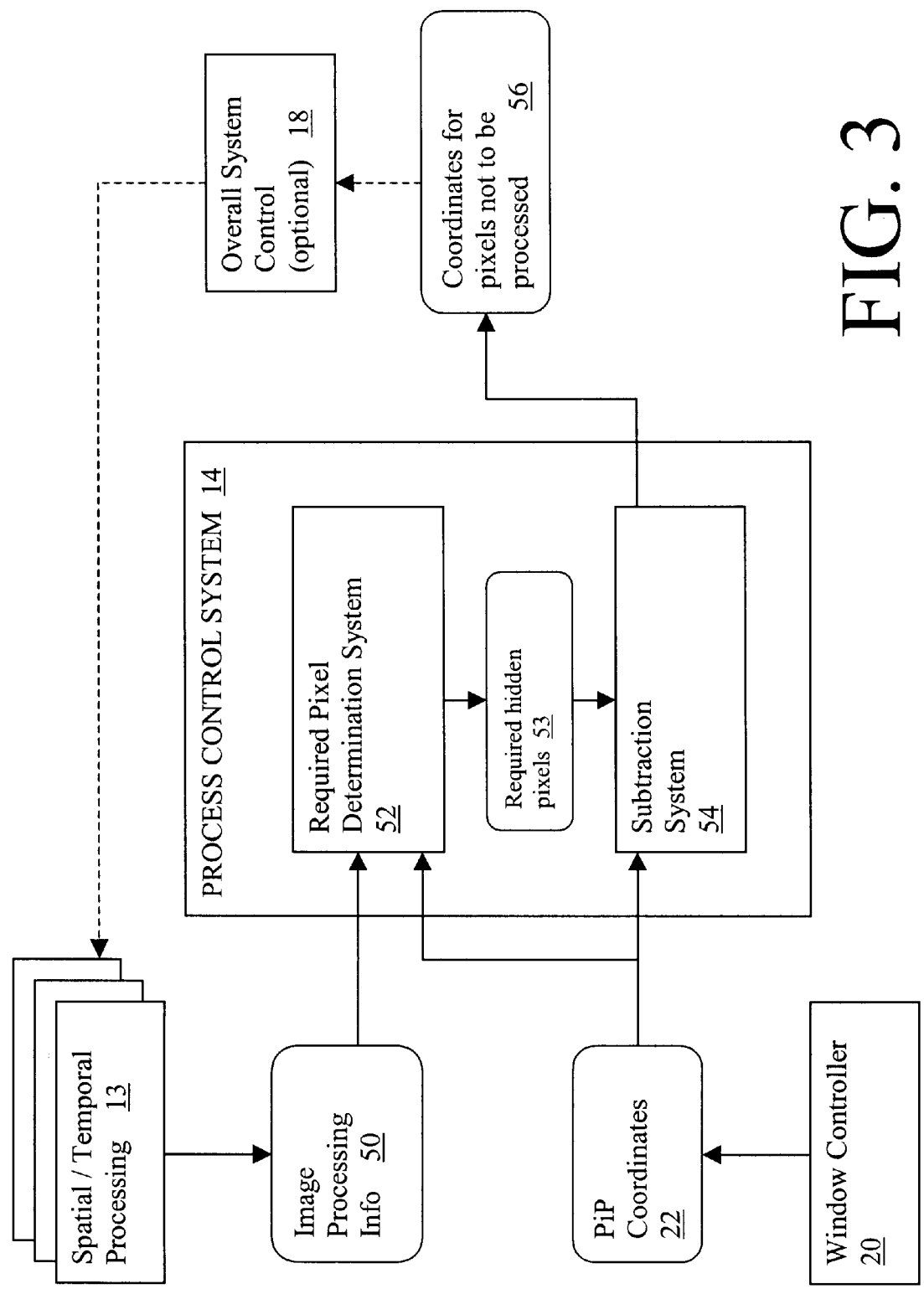
FIG. 3 depicts a window coordinate processing system in accordance with an embodiment of the invention.

Referring now to FIG. 3, the operation of process control system 14 is described in further detail. Process control system could exist as part of overall system control 18 or as a stand-alone system as shown. Process control system 14 includes a required pixel determination system 52 that determines which pixels in an overlapped area should be processed (i.e., the "required hidden pixels"). This information is determined using image processing information 50, obtained for example from spatial/temporal processing 13, as described above, along with PiP coordinates 22. Spatial/temporal processing 13 may be implemented by one or more media processing units (MPU's), described in further detail with regard to FIG. 4. PiP coordinates 22 are obtained from window controller 20. Process control system 14 further includes a subtraction system 54 that subtracts the required hidden pixels from the area defined by the PiP coordinates 22. The results of the subtraction operation provide the coordinates 56 for pixels in the overlapped area not to be processed. It should be understood that the resulting coordinates 56 provided by subtraction system 54 could comprise an arbitrary shape, or be further processed to provide a "cropped" rectangular area.

The coordinates 56 may be fed back, either directly or via overall system control 18 to influence each media processing unit (i.e., spatial/temporal processing 13). When a media processing unit processes image data at (D-1), prior to the outputting of the coordinates for display (D), it is readily known which pixels not to process. In a typical application however, a chain of media processing units may be utilized. Thus, a secondary media processing unit (D-2) connected to a primary media processing unit (D-1) would require information regarding pixels from the primary unit (D-1) about the not processed pixels or outputted coordinates 56. Depending on the number of media processing units, and the type of processing, a "ripple back" effect is created that causes more and more pixels to be involved in processing.

FIG. 4 depicts an example of the ripple back effect on pixel processing. On the bottom of the figure is a processing chain 60 for processing pixels in the first window 66. Exemplary frames 61, 63 and 65, of processed image data are depicted above the chain 60 for each step in the chain. The processing chain includes a display 71 (D) associated with a first frame 61; a primary media processing unit 73 "MPU (D-1)" associated with a second frame 63; and a secondary media processing unit 75 "MPU (D-2)" associated with a third frame 65. As frame 61 is being displayed at D, frames 63 and 65 are being processed for subsequent display.

As shown, frame 61 includes a first window 66 and a second window 64 overlaying a portion of the first window. For the purposes of this example, the display itself does not do spatial or temporal processing. In this example, the primary media processing unit 73 has identified a set of pixels 70, some of which reside within the unnecessary region, that are needed to process pixels residing outside of the overlaid portion of the first window. Accordingly, primary media processing unit 73 must calculate a "reduced unnecessary region" 68 for frame 63, and must process a greater number of pixels than required for frame 61. Similarly, secondary media processing unit 75 has identified a second set of pixels 74, some of which reside within the reduced unnecessary region, that are needed to process pixels residing outside of the reduced unnecessary region 68 of the first window. Accordingly, secondary media processing unit 75 must calculate a "further reduced unnecessary region" 72 for frame 65, and must process a greater number of pixels than required for both frames 63 and 61.

In order to address the problems associated with the ripple back effect, each media processing unit can report their calculated information 50 to required pixel determination system 52, which is part of process control system 14. Pixel determination system 52 determines which pixels in an overlapped area should be processed (i.e., the "required hidden pixels") for each media processing unit 13. This information is determined using image processing information 50, obtained for example from spatial/temporal processing 13, as described above, along with PiP coordinates 22. PiP coordinates 22 are obtained from window controller 20. Process control system 14 further includes a subtraction system 54 that subtracts the required hidden pixels from the area defined by the PiP coordinates 22 for each media processing unit 13. The results of the subtraction operation provide the coordinates 56 for pixels in the overlapped area not to be processed for each media processing unit 13. It should be understood that the resulting coordinates 56 provided by subtraction system 54 could comprise an arbitrary shape, or be further processed to provide a "cropped" rectangular area. System 14 then provides the information to overall system control 18, or directly back to the primary media processing units 13. While this may result in some control overhead, it should result in reduced pixel processing. As a second option, required process control system can provide information on each pixel that never has to be processed by any of the media processing units. This causes very little control overhead, but may result in some pixels being unnecessarily processed. Accordingly, a combination of the two approaches could be utilized to provide an optimal solution.

If the analysis of pixels not to be processed becomes too complex or complicated, it might be advantageous to skip processing of some of the required hidden pixels. One example involves motion estimation/compensation, where segments of irregular shapes with different velocities may appear in a next frame. If only parts of the segments are processed, and parts that will be close to the overlapping window (window 2) are unprocessed, the overall visible error might be small.

It is understood that the systems, functions, mechanisms, methods, and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. The present invention can also be embedded in a computer program product, which comprises all the features enabling the implementation of the methods and functions described herein, and which—when loaded in a computer system—is able to carry out these methods and functions. Computer program, software program, program, program product, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the preferred embodiments of the invention have been presented for purposes of illustration and description. They are not intended to be exhaustive or to limit the invention to the precise form disclosed, and obviously many modifications and variations are possible in light of the above teachings. Such modifications and variations that are apparent to a person skilled in the art are intended to be included within the scope of this invention as defined by the accompanying claims.

What is claim is:

1. A system for processing overlapping images, comprising:
    a first image processing system for processing a first image in a first window;
    a second image processing system for processing a second image in a second window, wherein the second window overlaps a portion of the first window;
    a window controller that calculates a set of coordinates for the second window; and
    a process control system that determines a set of pixels not to process in the overlapped portion of the first window based on the calculated set of coordinates, and further determines any required hidden pixels in the overlapped portion necessary for processing at least one pixel outside the overlapped portion of the first window.

2. The system of claim 1, wherein the at least one pixel comprises a spatially dependent pixel in a non-overlapped portion of the first window.

3. The system of claim 2, wherein the required hidden pixels include at least one pixel vertically neighboring the spatially dependent pixel.

4. The system of claim 2, wherein the required hidden pixels include at least one pixel horizontally neighboring the spatially dependent pixel.

5. The system of claim 2, wherein the process control system subtracts the required hidden pixels from an area defined by the calculated set of coordinates.

6. The system of claim 2, further comprising a sharpness enhancement filter, wherein the spatially dependent pixels are determined from the sharpness enhancement filter.

7. The system of claim 1, wherein the at least one pixel comprises a temporally dependent pixel.

8. The system of claim 7, wherein the temporally dependent pixel exists in a neighboring frame.

9. The system of claim 7, wherein the temporally dependent pixels exist in neighboring fields.

10. The system of claim 1, each pixel in the overlapped portion is not processed.

11. A program product stored on a recordable medium for processing overlapping images, comprising:
   means for processing a first image;
   means for processing a second image, wherein the second image overlaps a portion of the first image;
   means for calculating a set of coordinates of the second image;
   means for determining a set of pixels not to process in the overlapped portion of the first image based on the calculated set of coordinates; and
   means for determining at least one required hidden pixel in the overlapped portion necessary for processing a pixel outside the second image.

12. The program product of claim 11, wherein the at least one required hidden pixel comprises a spatially dependent pixel.

13. The program product of claim 11, wherein the determining means determines if there are temporal dependencies in the overlapped portion for pixels outside of the overlapped portion.

14. The program product of claim 11, wherein the determining means causes each pixel in the overlapped portion not be processed.

15. A method for processing overlapping images, comprising:
   processing a first image;
   processing a second image, wherein the second image overlaps a portion of the first image;
   outputting a set of coordinates for the second image to a process control system; and
   determining a set of pixels not to process in the overlapped portion of the first image based on an area defined by the outputted set of coordinates less any required hidden pixels.

16. The method of claim 15, wherein the step of determining a set of pixels not to process includes the further step of determining at least one required hidden pixel in the overlapped portion necessary for processing a spatially dependent pixel outside the second image.

17. The method of claim 16, wherein the step of determining a set of pixels not to process includes the further step of determining if there are temporal dependencies in the overlapped portion for pixels outside of the overlapped portion.

18. The method of claim 15, wherein the step of determining a set of pixels not to process causes each pixel in the overlapped portion not be processed.

19. A system for processing overlapping images, comprising:
   a first image processing system for processing a first image in a first window;
   a second image processing system for processing a second image in a second window, wherein the second window overlaps a portion of the first window;
   an enhancement filter that spatially enhances a pixel in a non-overlapping portion of the first window using data from at least one neighboring pixel in the overlapped portion of the first window; and
   a process control system that identifies a subset of the pixels in the overlapped portion of the first window not to process, wherein the subset includes each pixel in the overlapped portion of the first window minus the at least one neighboring pixel in the overlapped portion of the first window.

20. A imaging system for generating an output comprised of a first window and a second window, wherein the second window overlays a portion of the first window, the imaging system comprising:
   a process control system that determines a region of unnecessary pixels within the overlaid portion of the first window for a first frame of image data;
   a first media processing unit that identifies a set of pixels within the region of unnecessary pixels that are required for processing a second frame of data, and calculates a reduced area of unnecessary pixels; and
   a second media processing unit that identifies a subset of the set of pixels required for processing a third frame of data and calculates a further reduced region of unnecessary pixels.

21. The imaging system of claim 20, wherein the process control system includes a required pixel determination system that identifies a set of pixels that never has to be processed by either the first and second media processing units.

* * * * *